(12) United States Patent
Klapman

(10) Patent No.: US 11,995,223 B2
(45) Date of Patent: May 28, 2024

(54) DATA STORAGE DEVICE ENCRYPTION

(71) Applicant: Western Digital Technologies, Inc., San Jose, CA (US)

(72) Inventor: Matthew Harris Klapman, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 326 days.

(21) Appl. No.: 17/218,180

(22) Filed: Mar. 31, 2021

(65) Prior Publication Data

US 2022/0121781 A1 Apr. 21, 2022

Related U.S. Application Data

(60) Provisional application No. 63/093,738, filed on Oct. 19, 2020.

(51) Int. Cl.
| | |
|---|---|
| *G06F 21/79* | (2013.01) |
| *G06F 3/06* | (2006.01) |
| *G06F 16/11* | (2019.01) |
| *G06F 21/60* | (2013.01) |
| *H04L 9/30* | (2006.01) |
| *H04L 9/32* | (2006.01) |

(52) U.S. Cl.
CPC ............ *G06F 21/79* (2013.01); *G06F 3/0604* (2013.01); *G06F 3/0659* (2013.01); *G06F 3/0679* (2013.01); *G06F 16/11* (2019.01); *G06F 21/602* (2013.01); *H04L 9/30* (2013.01); *H04L 9/3236* (2013.01); *G06F 2221/2107* (2013.01)

(58) Field of Classification Search
CPC . G06F 21/79; G06F 21/602; G06F 2221/2107
See application file for complete search history.

(56) References Cited

U.S. PATENT DOCUMENTS

| | | | |
|---|---|---|---|
| 6,853,727 B1 * | 2/2005 | Foster | H04N 5/913 380/239 |
| 8,341,430 B2 | 12/2012 | Ureche et al. | |
| 8,687,814 B2 | 4/2014 | Nord et al. | |
| (Continued) | | | |

OTHER PUBLICATIONS

International Search Report and Written Opinion for International Application No. PCT/US2021/038167, dated Oct. 10, 2021, 12 pgs.

(Continued)

*Primary Examiner* — David J Pearson
(74) *Attorney, Agent, or Firm* — Patent Law Works LLP

(57) ABSTRACT

This disclosure relates to data storage device (DSD) hardware and, more specifically, to systems and methods for encrypting data stored on a DSD. A DSD comprises a non-volatile storage medium to store multiple file system data objects using block addressing. A device controller is integrated with the DSD and comprises hardware circuitry configured to encrypt data to be stored on the storage medium. The controller receives a request for an encrypted file system data object from a host computer system, identifies one of the ranges of blocks where the requested encrypted file system data object is stored on the storage medium, and sends the file system data object stored in the identified range of blocks to the host computer system in encrypted form as stored on the storage medium.

20 Claims, 5 Drawing Sheets

(56) References Cited

U.S. PATENT DOCUMENTS

| | | | |
|---|---|---|---|
| 9,665,501 | B1 | 5/2017 | Obukhov et al. |
| 10,387,066 | B1 | 8/2019 | Gonczi |
| 2005/0091491 | A1* | 4/2005 | Lee ................ H04L 9/0825 |
| 2008/0114990 | A1* | 5/2008 | Hilbert ............. G06F 12/1458 |
| | | | 713/189 |
| 2008/0320317 | A1* | 12/2008 | Funahashi ............. G06F 21/34 |
| | | | 713/189 |
| 2009/0157942 | A1 | 6/2009 | Kulkarni |
| 2009/0172393 | A1 | 7/2009 | Tanik |
| 2010/0042832 | A1 | 2/2010 | Fujibayashi et al. |
| 2010/0100721 | A1* | 4/2010 | Su .................. H04L 9/0891 |
| | | | 380/278 |
| 2013/0145179 | A1 | 6/2013 | Rangegowda et al. |
| 2013/0311737 | A1 | 11/2013 | Shaw et al. |
| 2015/0242640 | A1 | 8/2015 | Obukhov et al. |
| 2019/0034090 | A1 | 1/2019 | De et al. |
| 2019/0042464 | A1 | 2/2019 | Genshaft et al. |
| 2019/0042781 | A1 | 2/2019 | Lukacs |
| 2019/0066801 | A1 | 2/2019 | Battaje et al. |
| 2019/0068221 | A1 | 2/2019 | Chen |
| 2019/0095632 | A1* | 3/2019 | Seinen ................. G06F 21/64 |
| 2019/0362081 | A1 | 11/2019 | Kanno |
| 2021/0019450 | A1* | 1/2021 | Li ..................... G11C 29/44 |
| 2021/0294523 | A1* | 9/2021 | Hu .................... G06F 21/79 |

OTHER PUBLICATIONS

International Search Report and Written Opinion for International Application No. PCT/US2021/038168, dated Oct. 14, 2021, 9 pgs.
"Storage: Managing and protecting all enterprise data", Is it wise to Encrypt Blocks?—Storage Technology Magazine, URL: <https://searchstorage.techtarget.com/magazineContent/Is-it-Wise-to-Encrypt-Blocks>, accessed on Jun. 19, 2019.
"VeraCrypt", VeraCrypt—Free Open source disk encryption with strong security for the Paranoid, URL: <https://www.veracrypt.fr/en/Home.html>, accessed on Jun. 19, 2019.
"Disk Encryption", Disk encryption—ArchWiki, URL: <https://wiki.archlinux.org/index.php/Disk_encryption>, accessed on Jun. 19, 2019.

* cited by examiner

DATA STORAGE DEVICE ENCRYPTION

TECHNICAL FIELD

Aspects of the disclosure relate generally to data storage device hardware and, more specifically, to systems and methods for encrypting data stored on a data storage device.

BACKGROUND

FIG. 1 illustrates a typical scenario 100 including a host computer system 101 and a data storage device (DSD) 102 connected to the host computer system 101 via a data link 103, such as Fibre Channel (FC), Serial Advanced Technology Attachment (SATA), Serial Attached Small Computer System Interface (SAS), or others. DSD 102 may be located within host computer system 101 or outside host computer system 101, such as on a separate rack in a server room.

Host computer system 101 further comprises a processor 104 and a volatile memory, such as random-access memory (RAM) 105. Host computer system 101 may be a desktop or laptop computer, a mobile device, or a server in a data centre and may have an operating system, such as Microsoft Windows or Linux installed thereon. Host computer system 101 may also be a virtual machine or a cloud instance or any other computing device. DSD 102 comprises a controller 106, a physical data storage medium 107, and a read/write device 108. While the current example describes a hard disk drive (HDD) with a rotating medium, this disclosure equally applies to other storage media, such as those found in solid state drives (SSDs) or tapes.

One difficulty with data storage is that the DSD 102 may be physically removed or stolen and mounted in a different host computer to retrieve sensitive information stored on the DSD 102. Therefore, it is important to provide encrypted "data at rest".

One approach to provide encrypted data at rest is full disk hardware encryption. To this end, controller 106 includes hardware circuitry that performs encryption functions, such as Advanced Encryption Standard (AES). Controller 106 can then encrypt all data that it receives via data link 103 and store the encrypted data on storage medium 107. Vice versa, controller 106 retrieves encrypted data from storage medium 107, decrypts the data, and sends the decrypted data over data link 103.

Processor 104 can then perform software encryption to encrypt the data received from DSD 102, which can be useful if the data is then sent over an insecure channel to a different computer system, for example. However, this is not an end-to-end solution because the data link 103 between the DSD and the host computer system 101 carries the data in plain text (i.e., unencrypted). Therefore, it may be possible for an attacker to eavesdrop on data link 103 and obtain unauthorised access to unencrypted data.

SUMMARY

There is provided an improvement in hardware encryption by encrypting the received data but de-activating decryption when data is requested. This way, a file, which spans the defined block range, can be retrieved in the form of multiple blocks in encrypted form. The blocks can then be sent across an insecure link and stored on a second computer system. The decryption hardware of the second computer system can then decrypt the blocks when needed.

Disclosed herein is a data storage device comprising:
a non-volatile storage medium to store multiple file system data objects using block addressing, the multiple file system data objects being addressable by respective ranges of blocks; and
a device controller integrated with the data storage device and comprising hardware circuitry configured to:
encrypt data to be stored on the storage medium based on a cryptographic key;
wherein the device controller is configured to:
receive a request for an encrypted file system data object from a host computer system;
identify one of the ranges of blocks where the requested encrypted file system data object is stored on the storage medium; and
send the file system data object stored in the identified range of blocks to the host computer system in encrypted form as stored on the storage medium.

In some embodiments, the device controller is further configured to control the hardware circuitry to encrypt the data to be stored on the storage medium using a single cryptographic key for the ranges of blocks.

In some embodiments, the device controller is further configured to control the hardware circuitry to encrypt the data to be stored on the storage medium using a single cryptographic key for one volume or one partition.

In some embodiments, the device controller is further configured to:
control the hardware circuitry to decrypt data stored on the storage medium, and
receive and execute commands from a command set, and the command set comprises a command to de-activate decryption of the data stored on the storage medium to cause the device controller to send the file system data object stored in the identified range of blocks to the host computer system in encrypted form as stored on the storage medium.

In some embodiments, the device controller is further configured to perform the step of receiving the request for the encrypted file system data object from the host computer system after receiving the command to de-activate decryption of the data stored on the storage medium.

In some embodiments, the multiple file system data objects are one or more of:
a file;
a group of files; and
a directory.

In some embodiments, the device controller is further configured to:
receive an indication of a range of blocks from a host file system that maintains a file structure with associations to the ranges of blocks;
control the hardware circuitry to encrypt data using the cryptographic key; and
write the data in encrypted form to the range of blocks of the storage medium.

In some embodiments, the data storage device further comprises data storage to store an association between the file system data objects and the respective ranges of blocks, wherein:
the association between the file system data objects and the respective ranges of blocks is encrypted with a cryptographic key, and
the device controller is further configured to:
receive a request for the association between the file system data objects and the respective ranges of blocks;
send the association between the file system data objects and the respective ranges of blocks to a host computer system to enable the host computer system to determine a range of blocks based on the stored association;

receive an indication of a range of blocks from a host file system that maintains a file structure with associations to the ranges of blocks; and send the file system data object stored in the range of blocks to the host computer system in encrypted form as stored on the storage medium.

In some embodiments, the device controller is further configured to:

receive the cryptographic key;

control the hardware circuitry to decrypt the association between the file system data objects and the respective ranges of blocks using the cryptographic key; and send the association between the file system data objects and the respective ranges of blocks to the host computer system in decrypted form.

In some embodiments, the device controller is further configured to:

control the hardware circuitry to encrypt data to be stored on the storage medium based on different cryptographic keys; and use each key of the different cryptographic keys for one of the ranges of blocks addressing a respective file system data object.

In some embodiments, the device controller is further configured to control the hardware circuitry to calculate a hash value of the file system data objects and to send the hash value to the host computer system for verification.

In some embodiments, the cryptographic key to encrypt the data to be stored on the storage medium is a public key associated with a private key that is stored external to the data storage device.

In some embodiments, the data storage device further comprises volatile memory to store the cryptographic key.

In some embodiments, the device controller is further configured to:

receive, from the host computer system, an indication of the cryptographic key; and control the hardware circuitry to encrypt data, using the cryptographic key, until receiving an indication of another cryptographic key.

In some embodiments, the device controller is further configured to:

receive and execute commands from a command set, wherein the command set comprises a command to activate decryption of the data stored on the storage medium;

receive an encrypted file system data object that has been encrypted external to the data storage device;

store the encrypted file system data object on the storage medium in encrypted form;

receive the cryptographic key from the host computer system;

receive the command to activate decryption of the data stored on the storage medium;

control the hardware circuitry to decrypt the file system data object on the storage medium using the cryptographic key received from the host computer system; and send the file system data object in decrypted form to the host computer system.

Disclosed herein is a method for storing data in a data storage device, the method comprising:

storing multiple file system data objects on a storage medium using block addressing, the multiple file system data objects being addressable by respective ranges of blocks;

using, by hardware circuitry integrated with the data storage device, a cryptographic key to encrypt data to be stored on the storage medium;

receiving a request for an encrypted file system data object from a host computer system;

identifying one of the ranges of blocks where the requested encrypted file system data object is stored on the storage medium; and sending the file system data object stored in the identified range of blocks to the host computer system in encrypted form as stored on the storage medium.

In some embodiments, the method further comprises:

receiving and executing commands from a command set, the command set comprising a command to activate decryption of the data stored on the storage medium;

receiving an encrypted file system data object that has been encrypted external to the data storage device;

storing the encrypted file system data object on the storage medium in encrypted form;

receiving the cryptographic key from a host computer system;

receiving the command to activate decryption of the data stored on the storage medium;

decrypting, by the hardware circuitry integrated with the data storage device, the file system data object on the storage medium using the cryptographic key received from the host computer system; and sending the file system data object in decrypted form to the host computer system.

In some embodiments, the method further comprises:

receiving and executing commands from a command set, the command set comprising a command to de-activate decryption of the data stored on the storage medium;

after receiving the command to de-activate decryption of the data stored on the storage medium, receiving, from a host computer system, a request for an encrypted file system data object, the request comprising an indication of a range of blocks; and sending the file system data object that is stored in the range of blocks in encrypted form as stored on the storage medium.

In some embodiments, the method further comprises:

encrypting data to be stored on the storage medium based on different cryptographic keys; and using each key of the different cryptographic keys for one of the ranges of blocks addressing a respective file system data object.

Disclosed herein is a non-transitory computer-readable storage medium integrated with a data storage device and with firmware stored thereon that, when executed by a controller of the data storage device, causes the controller to perform the steps of:

storing multiple file system data objects using block addressing, the multiple file system data objects being addressable by respective ranges of blocks;

using, by hardware circuitry integrated with the data storage device, a cryptographic key to encrypt data to be stored on the storage medium;

receiving a request for an encrypted file system data object from a host computer system;

identifying one of the ranges of blocks where the requested encrypted file system data object is stored on the storage medium; and sending the file system data object stored in the identified range of blocks to the host computer system in encrypted form as stored on the storage medium.

Disclosed herein is a data storage device comprising:

means for storing multiple file system data objects using block addressing, the multiple file system data objects being addressable by respective ranges of blocks;

means for using, by hardware circuitry integrated with the data storage device, a cryptographic key to encrypt data to be stored on the means for storing;

means for receiving a request for an encrypted file system data object from a host computer system;

means for identifying one of the ranges of blocks where the requested encrypted file system data object is stored on the means for storing; and means for sending the file system data object stored in the identified range of blocks to the host computer system in encrypted form as stored on the means for storing.

Figure 2:
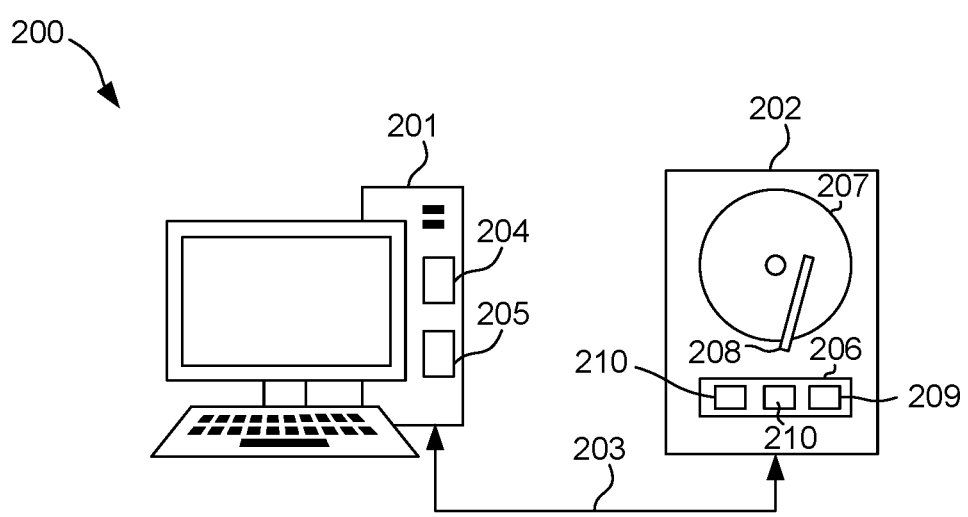

An example will now be described with reference to the following drawings:

FIG. 2 illustrates an example where the DSD uses different keys for different ranges of blocks, according to an embodiment.

Figure 3:
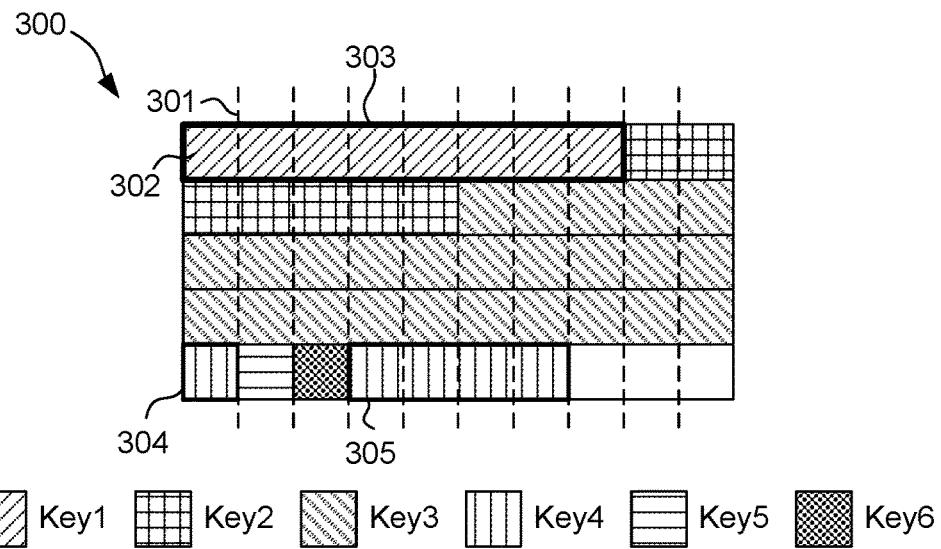

FIG. 3 shows an example data storage medium with block boundaries and ranges of blocks for which different keys are used, according to an embodiment.

Figure 4:
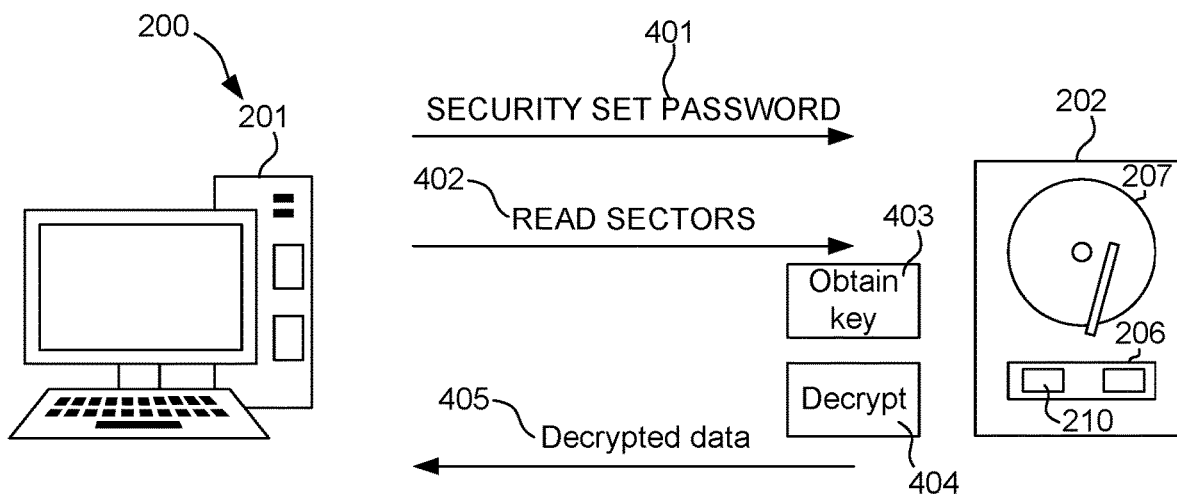

FIG. 4 illustrates one example where the controller sends the data (that was stored on the storage medium) in decrypted form, according to an embodiment.

Figure 5:
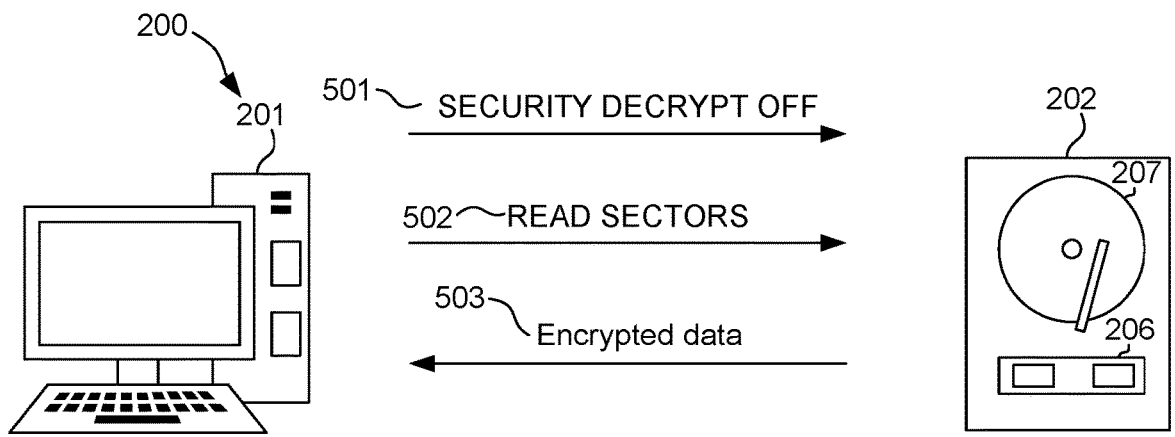

FIG. 5 illustrates an example where the controller sends the data (that was stored on the storage medium) in encrypted form, as the data is stored on the storage medium, according to an embodiment.

Figure 6:
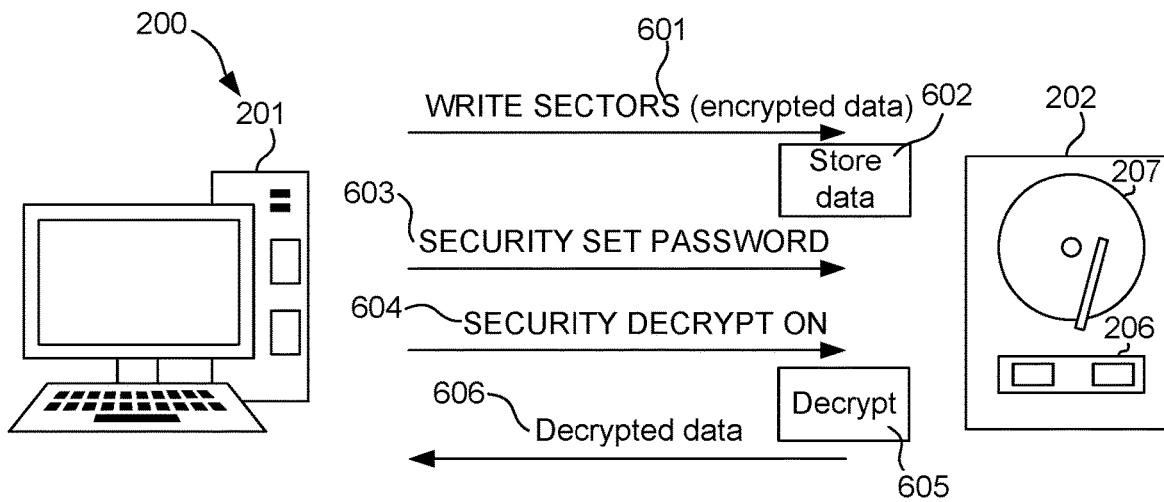

FIG. 6 illustrates a receiving DSD that receives an encrypted file system data object. The receiving DSD can decrypt the file system data object upon receipt of the appropriate key, according to an embodiment.

Figure 7:
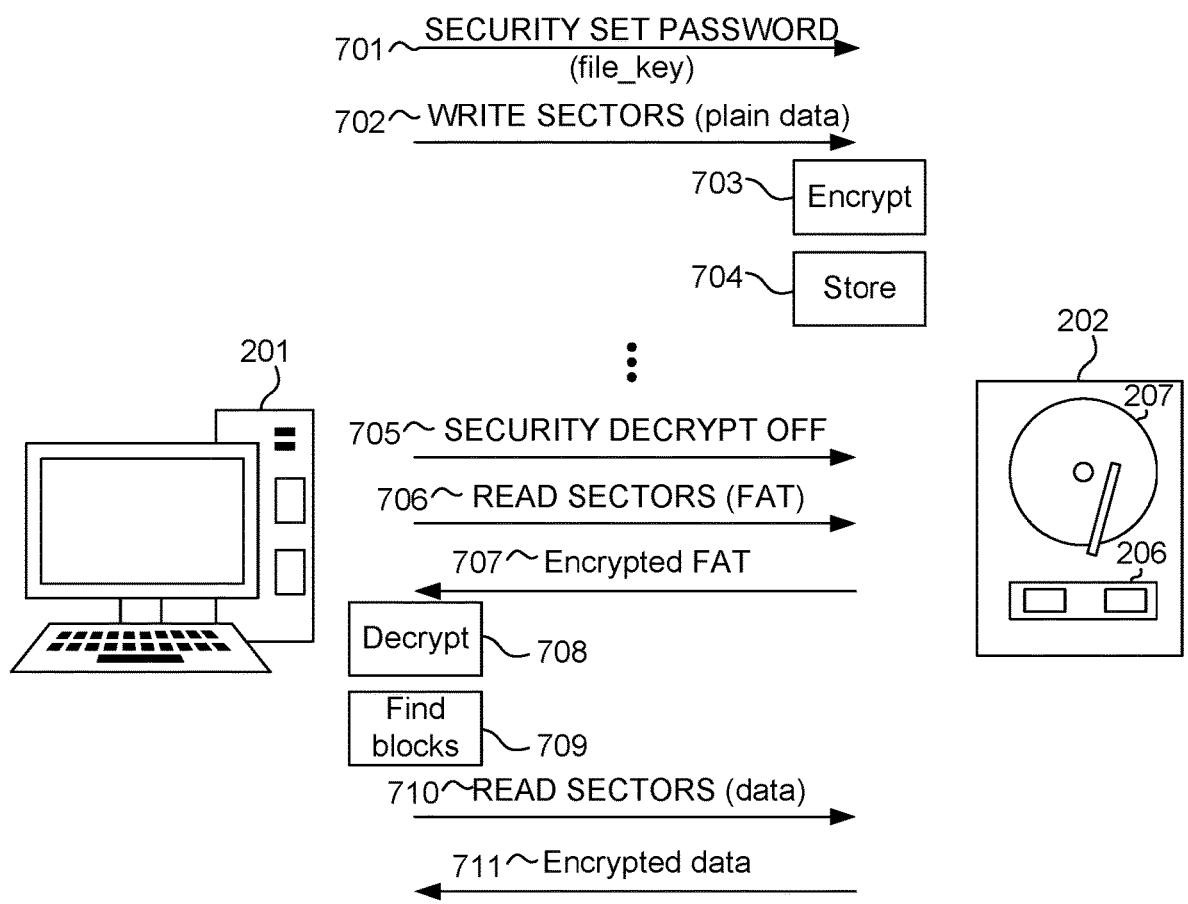

FIG. 7 illustrates another example of a data flow between a host computer system and a DSD, according to an embodiment.

Figure 8:
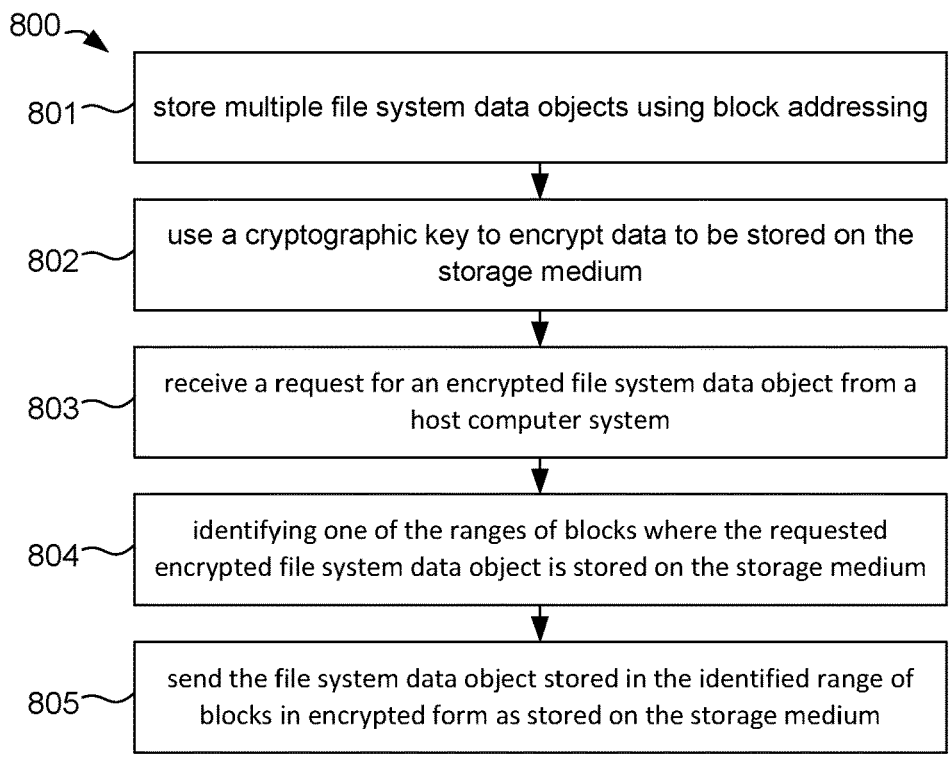

FIG. 8 illustrates a method for storing data in a DSD, according to an embodiment.

Figure 9:
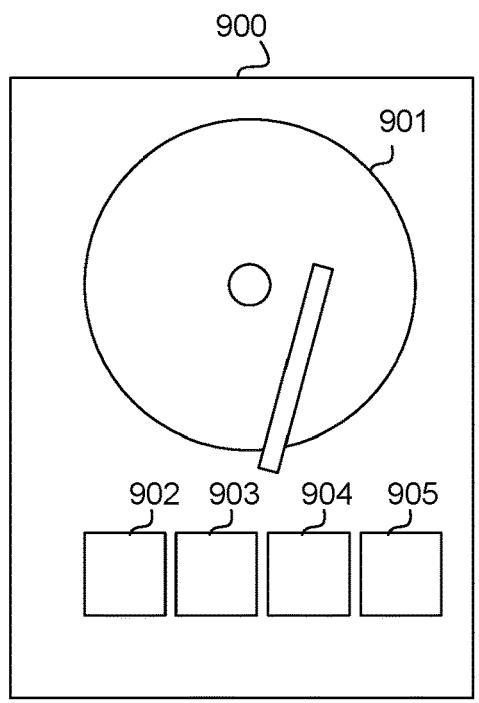

FIG. 9 illustrates a DSD comprising means for storing multiple file system data objects using block addressing, according to an embodiment.

DESCRIPTION OF EMBODIMENTS

FIG. 2 illustrates scenario 200, according to an embodiment. Scenario 200 includes a host computer system 201 and a data storage device (DSD) 202 connected to the host computer system 201 via a data link 203, such as Fibre Channel (FC), Serial ATA (SATA), Serial Attached SCSI (SAS), or others. DSD 202 may be located within host computer system 201 or outside host computer system 201, such as on a separate rack in a server room, in a cloud storage architecture, or connected as an external drive via universal serial bus (USB) or Firewire.

Host computer system 201 comprises a processor 204 and a volatile memory (RAM) 205. DSD 202 comprises a controller 206, which comprises hardware circuitry 210, such as a microcontroller with an x86, reduced instruction set computing (RISC), advanced RISC machine (ARM), or other architecture. Advantageously, controller 206 comprises dedicated hardware circuitry 210 to perform cryptographic function, such as a hardware implementation of an encryption and decryption algorithm. This provides the advantage that all reads and writes to and from the DSD 202 can be encrypted and decrypted at the full speed of DSD 202 so that encryption and decryption does not slow down the data transfer between host computer 201 and DSD 202. Example encryption and decryption algorithms that can be implemented in hardware include Blowfish and Advanced Encryption Standard (AES) with 128 bit, 192 bit, or 256 bit key length. In one example, controller comprises only encryption functionality (not decryption functionality), which can be useful for storage card media that is used in a camera capture device, for example. Controller 206 uses the dedicated hardware circuitry 210 when decryption or encryption is to be performed. In that sense, controller 206 controls the dedicated hardware circuitry 210 to perform encryption or decryption, such as by activating the hardware circuitry 210 by setting a digital enable signal that connects the processor in the controller 206 to the hardware circuitry 210.

DSD 202 further comprises a non-volatile physical data storage medium 207 and a read/write device 208 to store multiple file system data objects using block addressing. This means the multiple file system data objects are addressable by respective ranges of blocks. This is generally referred to as a block device, which means the DSD 202 supports reading and writing data in fixed-size blocks, sectors, or clusters. For example, these blocks may be 512 bytes or 4096 bytes each. Examples include block devices with rotating media, such as hard drives, and block devices using solid-state media, such as NOT-AND (NAND) flash memory cards, NAND flash memory chips, and solid state drives (SSDs).

A range of blocks means multiple blocks in a logical sequence that together store the file system data object. A range of blocks may be contiguous or may have gaps or splits. Further, a range of blocks may be defined by a start logical block address (LBA) and an end LBA. Alternatively, a range of blocks may be defined by a start LBA and a number of blocks of the range. It is also possible that the last block in the range includes a pointer to a further range in cases where the file system data object is spread over multiple ranges.

Controller 206 (also referred to as "device controller") is integrated with the DSD, which means that controller 206 is within an enclosure that contains all parts of the DSD 202 including the physical data storage medium 207. Importantly, integration of the controller 206 with the DSD 202 means that signals between controller 206 and storage medium and read/write device 208 are not readily accessible from the outside of the DSD 202 without disassembly of DSD 202. It is noted that some designs of DSD 202 do not allow disassembly of DSD 202 without damaging it.

Controller Configuration

Figure 1:
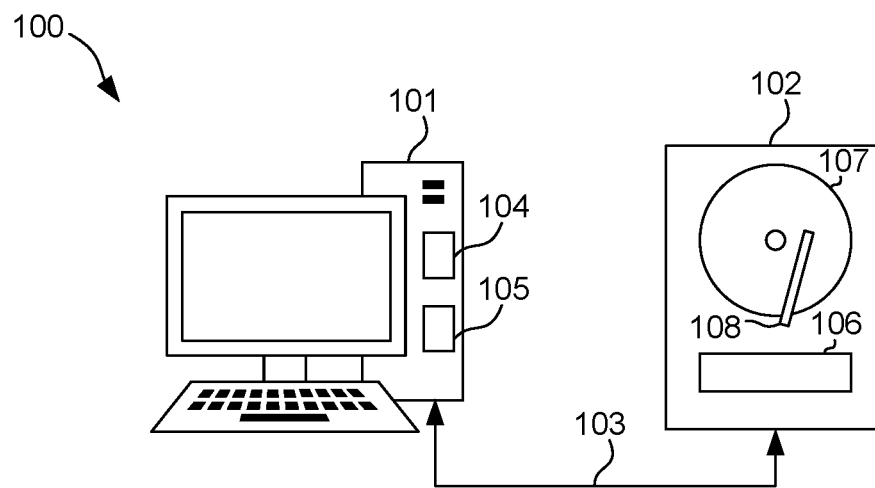
FIG. 1 illustrates a typical scenario according to prior art and involving a host computer system and a data storage device (DSD).

While the scenario in FIG. 2 appears similar to the scenario in FIG. 1, controller 206 in FIG. 2 is now configured to function differently to controller 106 in FIG. 1. The configuration of controller 206 may be by way of firmware installed on program memory 209 in the sense that methods described herein are implemented as source code, compiled, and written onto program memory 209 as machine code. FIG. 2 also shows a data memory 210 that can be used to store cryptographic keys as will be described below. Program memory 209 and data memory 210 may be volatile memory (e.g., RAM), non-volatile memory (e.g., read-only memory (ROM)), electrically erasable programmable read-only memory (EEPROM), flash memory, etc. Further, program memory 209 and data memory 210 may be integrated into controller 206 such as by being assembled onto the same board as controller 206, manufactured within the same chip/die, or connected to controller 206 via a data connection. It is also possible that controller 206 uses storage medium 207 as the data memory 210 and/or program memory 209.

Controller 206 executes the program code (that was stored on program memory 209) and, as a result, encrypts data to be stored on the storage medium 207 by controlling the cryptographic hardware circuitry 210. Controller 206 also decrypts data (that was stored on the storage medium) based on a cryptographic key also by controlling the cryptographic hardware circuitry 210. Controller 206 comprises hardware circuitry 210 that is configured to encrypt and decrypt data, which means that the circuitry, such as an application specific integrated circuit (ASIC) implementation, or gate level, semi-custom, or full-custom implementation of the cryptographic algorithm, is available to controller 206. However, parts of the circuitry 210 may be disabled as described herein to send and receive encrypted data. Controller 206 uses the cryptographic key to encrypt or decrypt data by providing access to the key for the hardware circuitry 210 or by indicating to the hardware circuitry 210 which cryptographic key to select for encryption or decryption.

FIG. 3 shows an example data storage medium 300, according to an embodiment, with block boundaries illustrated as dashed vertical lines, such as line 301 defining block 302 (shown as a square). Again, each block may have a predefined size, such as 512 or 4096 bytes. For simplicity, storage medium 300 is shown as a rectangular shape, but in rotating media the horizontal lines would be curved to form circles around the rotation axis while the vertical lines would be angled to define "sectors", which is therefore used as a synonym for "blocks" herein.

An example range of blocks 303 is shown outlined by a strong rectangle. In this example, ranges of blocks are encrypted with different respective cryptographic keys, noting that in other examples, the entire storage medium 300 may be encrypted with a single cryptographic key. Example range of blocks 303 is encrypted by the hardware circuit in controller 206 using a first encryption key. This is indicated by the shading pattern of the example range of blocks 303. The next range extends over two rows of storage medium 300 and a different key is used, which is indicated by the square shading pattern. In fact, each range is encrypted using a different key, which is generally indicated by a corresponding shading pattern in FIG. 3. It is noted that the blocks in the range of blocks do not need to be contiguous. For example, the range of blocks encrypted with "Key4" is fragmented into a first sub-range 304 (a single block) and a second sub-range 305 (four contiguous blocks). The blocks are numbered consecutively, and the file allocation table (FAT) stores the block number that indicates the start of each file and the length of the range from that block, which may be linked to the next starting block in the case of sub-ranges for fragmented files. When reference is made herein to a FAT, this should also be understood as including file system meta-data that includes journaling data.

Command Set

The program code stored on program memory 209 enables controller 206 to receive, interpret, and execute commands received from host computer system 201. For example, controller 206 may be configured to implement the Serial ATA (SATA) and/or ATA Packet Interface (ATAPI) command set, which is available from Technical Committee T13, noting that identical functionalities can be implemented within Trusted Computing Group (TCG) Opal, SCSI, and other proprietary architectures. Importantly, the command set comprises a READ SECTORS command with a command input of the count of sectors and the index of the starting sector (noting that "sector" is used synonymously with "block" herein). It is noted that there is a DSD driver installed on host computer system 101, and the DSD driver uses the command set to provide high-level services to the operating system, such as file read functionalities. Where new commands are disclosed herein, it is to be understood that these commands may be incorporated into the DSD driver installed on the host computer system 101 so that the new commands are available to the host computer system 101. For example, the operating system provides an encrypted file read function that returns the file as it has been encrypted by the hardware circuitry 210 integrated with DSD 202 at the time of storing that file.

The command set may include a command set from the ATA SECURITY feature set. In particular, the command set may include the command SECURITY SET PASSWORD. It is noted that this command in the ATA standard does not relate to encryption but merely to the access of the data on storage medium 207. In other words, user data may be stored in plain text (unencrypted), but the controller denies access until the correct password is provided through the SECURITY SET PASSWORD command and the device is unlocked with the SECURITY UNLOCK command.

In this disclosure, the SECURITY SET PASSWORD command may also be used by the host computer system 201 to send a password to DSD 202 for each of the ranges of blocks. However, controller 206 may implement further cryptographic commands, such as SECURITY DECRYPT ON and SECURITY DECRYPT OFF. While these commands do not define whether host computer system 201 can access the user data on storage medium 207, these commands define whether controller 206 decrypts the user data (SECURITY DECRYPT ON) or sends the data in encrypted form as stored on the storage medium 207 (SECURITY DECRYPT OFF) as described further below. It is noted that the previously mentioned commands can still be used to lock/unlock the data storage device 202 from all data access.

In a further example, controller 206 calculates a hash, such as a message digest 5 (MD5), on each file that can be sent back to the host computer system 201. This hash can be calculated to validate that the data written to the storage medium 207 was correctly written (e.g., by writing the value, reading it back, and calculating the hash value). The final hash value can be requested by the host computer system 201 to see if it matches the original file hash value. This feature provides hardware accelerated hash that would save time for the enterprises that perform this function at a higher level (e.g., reading the entire file, after it is written, to calculate the hash). It could also be a feature for controller 206 to calculate a hash value on a file at a later date to verify the data integrity of the file. The hash may be on the encrypted or unencrypted file data. This can be implemented with SET HASH ON/OFF, READ HASH VALUE, and PERFORM HASH ON BLOCK RANGE nn to mm types of commands.

File Allocation Table

The ranges of blocks for each file system data object may be defined in a file allocation table (FAT) stored on data memory 210 or on storage medium 207. In this table, each file system data object is represented by a single linked list of blocks. In other words, data memory 210 stores an association between the file system data objects and the respective ranges of blocks. Again, it is noted that this association (the FAT) can be stored on storage medium 207 itself according to the FAT32 format, for example. The FAT may also be referred to as "block graph structure".

File system data objects include files, groups of files, folders, and groups of folders. In one example, controller 206 uses the same cryptographic key for all files, while in a different example, controller 206 uses a different cryptographic key for each file stored on storage medium 207. In other examples, the files are divided into groups, such as groups of files with the same owner, such that all files with the same owner can be encrypted and decrypted with the same cryptographic key but files with a different owner need a different key.

It is noted that the FAT can be stored on data memory 210 or storage medium 207 in encrypted form. In that case, the key used for encryption and decryption of the FAT is referred to as "volume key". In many cases, the FAT is relatively small compared to other files, so the computational load for decrypting the FAT is relatively low. This means that practically, the host computer system 201 as well as the controller 206 can decrypt the FAT. Therefore, the host computer system 201 can either (1) send the SECURITY DECRYPT OFF command, read the encrypted FAT, decrypt the FAT locally with processor 204, and identify the range of blocks for a particular requested file or (2) send the volume key with SECURITY SET PASSWORD (volume_key), turn decryption on with SECURITY DECRYPT ON, and read the unencrypted FAT. In this context it is noted that the volume_key may be identical to or different from the cryptographic key used to encrypt the file system data objects.

From the view of controller 206, data memory 210 stores the association between the file system data objects and the respective ranges of blocks (FAT). The association between the file system data objects and the respective ranges of blocks is encrypted with the volume_key. Controller 206 then receives a request for the FAT and sends the FAT to host computer system 201 to enable the host computer system to determine a range of blocks based on the FAT. The request for the FAT may be a standard read command (READ SECTORS) with the starting block being the predefined start of the FAT, such as Logical Block Address (LBA) 65 and the number of blocks being the size of the FAT.

As described in more detail herein, controller 206 then receives from host computer system 201 a data key (which may be identical to the volume_key) and an indication of a range of blocks (as determined by host computer system 201 based on the FAT). In that sense, host computer system 201 maintains a file structure with associations to the ranges of blocks. Finally, controller 206 uses the data key for decrypting the file system data object stored in the range of blocks and sends the decrypted file system data object to the host computer system.

In one example, controller 206 sends the FAT in decrypted form. That is, controller 206 receives the volume_key, decrypts the FAT using the volume_key, and sends the FAT to the host computer system in decrypted form. Host computer system 201 can then use the FAT to determine block ranges for files by looking up block ranges using the full path of each file. In another example, controller 206 sends the FAT in encrypted form, and host computer system 201 decrypts the FAT using the volume_key.

Send Decrypted Data

FIG. 4 illustrates one example where device controller 206 sends the data (that was stored on storage medium 207) in decrypted form, according to an embodiment. It is noted that controller 206 may provide both functionalities of sending encrypted and decrypted data. These may occur at different times and may be controlled through the activation and de-activation of the decryption circuitry, by way of commands received from host computer as described herein. Controller 206 may obtain the necessary cryptographic key from data memory 210. Controller 206 may also have received the cryptographic key from the host computer system 201 with a previous command, such as SECURITY SET PASSWORD 401, and saved the key on data memory 210. Then, controller 206 receives a request 402 for a decrypted file system data object from host computer system 201. This request may be a standard SATA command for reading a range of blocks, such as READ SECTORS. In response, controller 206 identifies one of the ranges of blocks where the file system data object is stored, such as by extracting the block numbers from the read request. Then, controller 206 obtains one of the different cryptographic keys 403 based on the one of the ranges of blocks by using the last received key from step 401 or a key from a stored list of keys. Controller 206 can then decrypt 404 the file system data object stored on the storage medium using the obtained cryptographic key and send the decrypted file system data object 405 to host computer system 201.

It is noted that there may be multiple different cryptographic keys that can each encrypt different file system data objects as shown in FIG. 3. This means the DSD 202 may support per-file encryption. Such per-file encryption would be similar to file encryption by processor 204 of host system 201, but with the advantage of hardware acceleration due to the hardware implementation of the encryption and decryption algorithm integrated with DSD 202. Therefore, the host computer system 201 can maintain a list of keys with one key per file.

Send Encrypted Data

FIG. 5 illustrates a further example where controller 206 sends data (that was stored on storage medium 207) in encrypted form, as the data is stored on storage medium 207, according to an embodiment. More particularly, controller 206 receives and executes commands from a command set, which, as described above, comprises a command to de-activate decryption of the data stored on the storage medium (SECURITY DECRYPT OFF) 501. This command causes controller 206, in response to read request 502, to send 503 the file system data objects to the host computer system 201 in encrypted form as stored on the storage medium 207. In another example, the default is that controller 206 sends encrypted data without the need for a command. In yet a further example, the controller 206 does not have the capability to decrypt any data and so can send only encrypted data. Advantageously, an attacker cannot steal any unencrypted data by intercepting the communication between the DSD 202 and the host computer system 201. Host computer system 201 can send the encrypted data over an insecure channel, such as email or cloud storage, and a receiving system can decrypt the data by storing the data on another storage medium and activating decryption. In the example illustrated by FIG. 5, controller 206 can still provide hardware accelerated encryption.

It is noted that an entire disk can be sent in encrypted form from one disk to another. This would be useful for disk cloning as well as transferring the entire contents over a network to another computer.

Receive Encrypted Data

The receiving system may be a similar DSD to that shown in FIG. 2, so for the following description it is assumed that DSD 202 receives the encrypted file system data object from another DSD (with the respective host computer systems in between). As a result, FIG. 6 shows DSD 202 as the receiving DSD, and controller 206 is again configured to receive and execute commands from a command set, according to an embodiment. However, now the command set comprises a command to activate decryption of the data stored on the storage medium. Receiving DSD 202 receives 601 an encrypted file system data object that has been encrypted externally to the receiving DSD, such as by a sending DSD. It is important to note that the file system data object is not encrypted by a host computer system or another third party computer system. Instead, the file system data object has been encrypted by another DSD, that is, by hardware circuitry 210 integrated with the sending DSD. This ensures that the data is always encrypted and is not transmitted in unencrypted form.

Controller 206 stores 602 the encrypted file system data object on the storage medium 207 in encrypted form. At this stage, the data is identical to the case where the controller 206 encrypts the data at the first place (assuming the same key is used). Controller 206 receives 603 that key from a host computer system. For example, the party that has sent the encrypted data has also provided the corresponding key via a separate channel to the host computer system 201, which forwards the key to DSD 201.

Controller 206 also receives the command 604 to activate decryption of the data stored on the storage medium. This causes controller 206, in response to a data request, to decrypt 605, by the hardware circuitry 210 of the device controller integrated with the DSD, the file system data object on the storage medium. For this decryption, controller 206 uses the cryptographic key received from the host computer system in step 603. Finally, controller 206 sends 606 the file system data object in decrypted form to the host computer system.

Read Request with or without Block Range

There are different options in relation to mapping the file system data objects to block ranges. In most cases, DSD 202 stores an association between the file system data objects, such as files, and the block ranges. Examples include file allocation tables and block graph structures. This association can be used by host computer system 201 or controller 206. In one example, the host computer system 201 performs the mapping, which means that the read request from the host computer system 201 already comprises an indication of a range of blocks according to the standard ATA command set. Controller 206 receives that read request typically after receiving the command to de-activate decryption of the data stored on the data storage medium. In response, controller 206 does not decrypt the data but sends the one of the multiple file system data objects that is stored in the range of blocks in encrypted form as stored on the storage medium.

In another example, controller 206 performs the mapping, which means controller 206 receives a request for an encrypted file system data object from a host computer system. This request identifies the file system data object, such as by providing a full path of the file, but not the block range. Therefore, controller 206 identifies one of the ranges of blocks where the requested encrypted file system data object is stored on the storage medium. Controller 206 achieves this by querying the stored associations in the FAT to find the first block and the number of blocks, for example. Controller 206 then sends the file system data object (that was stored in the identified range of blocks) to the host computer system in encrypted form, as stored on the storage medium.

Key Generation

In one example, controller 206 generates an asymmetric key pair comprising a public key and a private key. Controller 206 may include circuitry or software to generate new keys, which may be symmetric or asymmetric. Controller 206 then sends the public key to host computer system 201 via datalink 203, where it is stored on volatile memory 205. This public key is said to be associated with a corresponding private key stored on the DSD 202. The public key is generated by the controller 206 by executing an elliptic curve cryptography (ECC) primitive ECC-Pub({private key}). (Recall that while elliptic curve cryptography is used herein as examples for reasons of computational efficiency and security, it is noted that other cryptographic techniques could equally be used.) The corresponding private key is stored on data memory 210 of DSD 202, and the public key is sent to host computer system 201 and stored in memory 205. The host computer system 201 is configured to use the public key, also referred to as identifier, or to generate and store a further public key, to generate a challenge for the DSD 202. It is noted here that the challenge is unique in the sense that each challenge is different, so that a subsequent challenge is different from any previous challenges. As described below, this is achieved by multiplying the stored data by a random blinding factor. Then, the host computer system 201 sends the challenge to the DSD 202 over a communication channel that may be different from the data link 203. For example, the data link 203 may include a wire-based USB connection, while the key communication channel between the host computer system 201 and the DSD 202 is a wireless (e.g., Bluetooth) connection.

The controller 206 can calculate a response to the challenge that cannot be calculated by any other device. More specifically, the correct response cannot be calculated by a device that does not have access to data that corresponds to the identifier stored on memory 205. For example, controller 206 uses the stored private key (that is associated with the corresponding public key stored on memory 205) to calculate the response to the challenge. The correct response can then be used to calculate a cryptographic key to encrypt and decrypt data stored on storage medium 207. In one example, where the controller 206 does not decrypt the encrypted data, controller 206 may store only a public key and use that public key for encryption. On request, controller 206 then sends the encrypted data to a device that has the private key required for decryption. For example, there may be two DSDs, where the first DSD generates the private/public key pair and sends only the public key to the second DSD (such as a camera storage card). The second DSD controls the integrated hardware circuitry to encrypt data using the public key and, on request, sends the encrypted data to the first DSD (potentially via a host computer system, including a memory card reader). The first DSD can then use the private key to decrypt the data.

In yet a further example, the host computer system 201 generates the private/public key pair and stores the private key securely on non-volatile memory. Controller 206 then registers the host computer system 201 by storing the public key associated with the private key stored on host computer system 201. Controller 206 can then send a challenge to the host computer system 201, and only the host computer system 201 can calculate the correct response based on the stored private key. Controller 206 receives the response to the challenge from the host computer system 201 over the communication channel. It is noted here that if the controller 206 simply validates the response to the challenge and, upon success, reads the cryptographic key from memory 210, then the cryptographic key would be stored in plain text, which is undesirable since this would enable an attacker to disassemble the DSD 202 and read the key from memory 210 to access the user content data stored on storage medium 207.
Calculate Key So, instead, controller 206 calculates the cryptographic key based at least partly on the response from the host computer system 201. This means the cryptographic key is not a pure function of the response but involves other values as well. The cryptographic key is stored in encrypted form on memory 210, and the response, which is based on the private key stored on the host computer system 201, enables the calculation of the secret that decrypts the cryptographic key.

In one example, the challenge generated by the controller 206 and sent to the host computer system 201 is based on elliptic curve cryptography. This has the advantages of shorter keys, which leads to more efficient communication and storage. Further, host computer systems may provide dedicated functionality of elliptic curve cryptography within a secure hardware module. The secure hardware module securely stores the private keys and performs cryptographic primitives within the secure hardware module without the key leaving the secure hardware module and being sent to a general purpose processor core, e.g. processor 204, where the key may be subject to an attack for unauthorized retrieval. In one embodiment, the secure hardware module includes a separate processor that executes its own microkernel, which is not directly accessible by the operating system or any programs running on the general purpose processor core. The secure hardware module can also include non-volatile storage, which is used to store 256-bit elliptic curve private keys. In one embodiment, the secure hardware module is a Secure Enclave coprocessor that is available on some Apple devices. The secure hardware module may be in host computer system 201 or in DSD 202 to generate and store the private key, respectively. The above process can then be repeated for each of the different cryptographic keys for different ranges of blocks. Host computer system 201 and DSD 202 may also perform a Diffie-Hellman (DH) key exchange, which may be based on Elliptic Curve Cryptography (ECC-DH).

Further information about key generation can be found in United States of America patent application Ser. No. 16/706,780, filed on Dec. 8, 2019, Entitled: Unlocking a data storage device, which is incorporated herein in full by reference.

It is also possible for one or more keys to be temporarily stored in volatile memory included in DSD 202. This "key cache" would minimize sending keys over data link 203 to enable speed efficiency and improve security. The host computer system 201 can refer to each key as a table entry, SET PASSWORD 1, SET PASSWORD 2, SECURITY DECRYPT ON 1, SECURITY DECRYPT ON 2, etc. If power is removed from DSD 202 or DSD 202 is opened and a physical tampering detection circuit is triggered, then the keys become inaccessible to protect the security of DSD 202. If DSD 202 is in a status where the key is inaccessible, it may automatically revert to sending encrypted data without receiving any keys. In that sense, any host computer system can power-up DSD 202 and read encrypted data. But only the host computer system with the key (or access to a DSD with the key) can decrypt the data.
Key Selection There are different options of how to choose the appropriate keys for encryption and decryption. In a first example, the host computer system 201 maintains the FAT, and the controller 206 receives an indication of a range of blocks, such as a starting block address and a number of blocks. Controller 206 then selects one of the different cryptographic keys based on the indicated range of blocks. To that end, controller 206 may maintain a table that stores, for each starting block address, the corresponding key. That is, the table has one row for each file system data object, and each row includes a starting block address and a key. Controller 206 then queries the table for the received starting block address and uses the cryptographic key selected from the table for encrypting data.

In other examples, controller 206 performs the mapping between the file system data object and the range of blocks as described above. That is, controller 206 receives a request for a file system data object and determines a range of blocks based on the stored FAT. Controller 206 then selects one of the multiple cryptographic keys based on the determined range of blocks. Again, this could involve the use of a key table that may store the starting block address or the full path of the file system data object or both in a row with the corresponding key. Therefore, controller 206 may also select the key by looking up the full path in the key table instead of the starting block address. Controller 206 then uses the selected cryptographic key for decrypting the file system data object stored in the determined range of blocks and sends the decrypted file system data object.

As described above, controller 206 may be further configured to receive, from host computer system 201, the different keys. Controller 206 then stores the keys within DSD 202, which may comprise volatile memory to store the one or more of the different cryptographic keys, such that the keys do not remain in the DSD 202 when the DSD 202 is powered down. Controller 206 may receive the different cryptographic keys from host computer system 201 with a command, such as SECURITY SET PASSWORD. Controller 206 then uses that key for encrypting and decrypting data until receiving an indication of a different key through the same command. Again, there may be only a single key, and controller 206 uses that single key for encryption of all files.

In further examples, the key is sent via a communication channel different from the communication channel used to send the encrypted data, such as a wireless (e.g., Bluetooth) channel. Further, the key may be sent at different times relative to the encrypted data, such as time-shifted, to disassociate the key from the encrypted data.
Data Flow Example FIG. 7 illustrates another example which shows the complete data flow, according to an embodiment. First, host computer system 201 sets 701 the per-file encryption key by issuing a SECURITY SET PASSWORD (file key) command. This activates the hardware encryption module with the file key. Then, host computer system 201 issues 702 a WRITE SECTORS command to send the file data in unencrypted form to DSD 202. Since host computer system 201 maintains the FAT at this stage, host computer system 201 may also perform the allocation of the file data to blocks and specify those blocks or at least the starting block address in the write command. Controller 206 then encrypts 703 the received data with the file key and stores 704 the encrypted data on storage medium 207. The data is now stored, and the DSD 202 can be used for unrelated tasks or powered down. At a later stage, when the data needs to be read, host computer system 201 deactivates decryption 705 by issuing a SECURITY DECRYPT OFF command. Alternatively, decryption may be deactivated by default, so sending the command is not necessary. Host computer system 201 then reads 706 the FAT table by issuing a READ SECTORS command for the predefined sectors where the FAT is stored. In response, controller 206 returns 707 the encrypted FAT to the host computer system 201. Host computer system 201 then decrypts 708 the FAT using the volume_key (which is different from the file key). Alternatively, host computer system 201 can activate decryption and read the FAT in decrypted form.

From the decrypted FAT, host computer system 201 can now find the required blocks 709 for a particular file and read those blocks 710 by issuing a READ SECTORS command for those blocks. Controller 206 responds by sending 711 the encrypted file data back to the host computer system 201. This encrypted file data can now be stored elsewhere or sent over an insecure communication channel. Since the file key is available (with restricted access of course), the encrypted file data can be decrypted by authorised entities that have the key.

Method

FIG. 8 illustrates a method 800 for storing data in DSD 202, according to an embodiment. Method 800 may be performed by controller 206 in the sense that method 800 is implemented in program code that is stored in program memory 209, noting that the program code controls hardware circuitry 210 to perform individual commands. That is, program memory 209 is a non-transitory computer-readable storage medium integrated with a DSD and with firmware stored thereon that, when executed by a controller of the DSD, causes the controller to perform the steps of method 800.

In particular, the method comprises storing 801 multiple file system data objects using block addressing. The multiple file system data objects are addressable by respective ranges of blocks as shown in FIG. 3. Controller 206 uses 802, by controlling hardware circuitry 210 integrated with the DSD, a cryptographic key to encrypt data to be stored on the storage medium. The one of the different cryptographic keys is used for a respective one of the ranges of blocks addressing one of the multiple file system data objects. Further, controller 206 receives 803 a request for an encrypted file system data object from a host computer system and identifies 804 one of the ranges of blocks where the requested encrypted file system data object is stored on the storage medium. Then, controller 206 sends 805 the file system data object stored in the identified range of blocks to the host computer system in encrypted form as stored on the storage medium.

Data Storage Device

FIG. 9 illustrates a DSD 900, according to an embodiment, comprising means 901 for storing multiple file system data objects using block addressing. The multiple file system data objects are addressable by respective ranges of blocks as shown in FIG. 3. The means 901 for storing may comprise a rotating storage medium (such as a magnetic hard disk), a solid state storage medium (such as in a solid state drive (SSD)), or other suitable storage medium. DSD 900 further comprises means 902 for using, by hardware circuitry 210 integrated with the DSD 900, a cryptographic key to encrypt data to be stored on the means 901 for storing. Different cryptographic keys may be used for respective ranges of blocks addressing one of the multiple file system data objects. DSD 900 further comprises means 903 for receiving a request for an encrypted file system data object from a host computer system, means 904 for identifying one of the ranges of blocks where the requested encrypted file system data object is stored on the storage medium, and means 905 for sending the file system data object stored in the identified range of blocks to the host computer system in encrypted form as stored on the storage medium. The means 902, 903, 904, and 905 may be a data storage device controller including a microprocessor integrated with or connected to a hardware circuit that implements an encryption and decryption algorithm in hardware. Means 902, 903, 904, and 905 may be integrated and implemented in a single electronic device, such as a processor. Further, means 902 may be implemented as separate hardware circuitry while means 903, 904, and 905 are implemented together on one processor. Other implementations, such as ASICs, field-programmable gate arrays (FPGAs) or other architectures may equally be used for means 902, 903, 904, and 905.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A data storage device comprising:
   a non-volatile storage medium configured to store multiple file system data objects using block addressing, the multiple file system data objects being addressable by respective ranges of blocks; and
   a device controller integrated with the data storage device and comprising hardware circuitry configured to encrypt data to be stored on the storage medium based on at least one cryptographic key, wherein the device controller is configured to:
      store an association, in an encrypted form, between the multiple file system data objects and the respective ranges of blocks;
      receive, from a host computer system, a request for the association between the multiple file system data objects and the respective ranges of blocks;
      control the hardware circuitry to decrypt, using a cryptographic key, the association between the multiple file system data objects and the respective ranges of blocks;
      send, to the host computer system, the association between the multiple file system data objects and the respective ranges of blocks in decrypted form;
      receive, from the host computer system, a request for an encrypted file system data object;
      identify a range of blocks where the requested encrypted file system data object is stored on the storage medium; and
      send, to the host computer system, the file system data object stored in the identified range of blocks in encrypted form as stored on the storage medium.

2. The data storage device of claim 1, wherein the device controller is further configured to control the hardware circuitry to encrypt the data to be stored on the storage medium using a single cryptographic key for ranges of blocks.

3. The data storage device of claim 1, wherein the device controller is further configured to control the hardware circuitry to encrypt the data to be stored on the storage medium using a single cryptographic key for one volume or one partition.

4. The data storage device of claim 1, wherein:
   the device controller is further configured to:
      control the hardware circuitry to decrypt data stored on the storage medium, and receive and execute commands from a command set; and
   the command set comprises a command to de-activate decryption of the data stored on the storage medium to cause the device controller to send the file system data object stored in the identified range of blocks to the host computer system in encrypted form as stored on the storage medium.

5. The data storage device of claim 4, wherein the device controller is further configured to perform the step of receiving the request for the encrypted file system data object from the host computer system after receiving the command to de-activate decryption of the data stored on the storage medium.

6. The data storage device of claim 1, wherein the multiple file system data objects are one or more of:
a file;
a group of files; and
a directory.

7. The data storage device of claim 1, wherein the device controller is further configured to:
receive, from a host file system, an indication of a target range of blocks that maintains a file structure with associations to the respective ranges of blocks for the multiple file system data objects;
control the hardware circuitry to encrypt data using a single cryptographic key; and
write the data in encrypted form to the target range of blocks of the storage medium.

8. The data storage device of claim 1, further comprising data storage to store the association between the multiple file system data objects and the respective ranges of blocks, wherein the device controller is further configured to:
encrypt, using the cryptographic key, the association between the multiple file system data objects and the respective ranges of blocks prior to storing the association between the multiple file system data objects and the respective ranges of blocks in the data storage; and
receive, responsive to sending the association between the multiple file system data objects and the respective ranges of blocks, an indication of a target range of blocks from a host file system that maintains a file structure with associations to the respective ranges of blocks for the multiple file system data objects.

9. The data storage device of claim 1, wherein:
the device controller is further configured to receive the cryptographic key from the host computer system; and
the cryptographic key is different from a second cryptographic key used to encrypt the requested encrypted file system data object.

10. The data storage device of claim 1, wherein the device controller is further configured to:
control the hardware circuitry to encrypt data to be stored on the storage medium based on different cryptographic keys; and
use each key of the different cryptographic keys for one of the respective ranges of blocks addressing a respective file system data object.

11. The data storage device of claim 1, wherein the device controller is further configured to control the hardware circuitry to calculate a hash value of the multiple file system data objects and to send the hash value to the host computer system for verification.

12. The data storage device of claim 1, wherein the at least one cryptographic key to encrypt the data to be stored on the storage medium is a public key associated with a private key that is stored external to the data storage device.

13. The data storage device of claim 12, further comprising volatile memory to store the at least one cryptographic key.

14. The data storage device of claim 1, wherein the device controller is further configured to:
receive, from the host computer system, an indication of the at least one cryptographic key; and
control the hardware circuitry to encrypt data, using the at least one cryptographic key, until receiving an indication of another cryptographic key.

15. The data storage device of claim 1, wherein the device controller is further configured to:
receive and execute commands from a command set, wherein the command set comprises a command to activate decryption of the data stored on the storage medium;
receive an encrypted file system data object that has been encrypted external to the data storage device;
store the encrypted file system data object on the storage medium in encrypted form;
receive the at least one cryptographic key from the host computer system;
receive the command to activate decryption of the data stored on the storage medium;
control the hardware circuitry to decrypt the file system data object on the storage medium using the at least one cryptographic key received from the host computer system; and
send the file system data object in decrypted form to the host computer system.

16. A method for storing data in a data storage device, the method comprising:
storing multiple file system data objects on a storage medium using block addressing, the multiple file system data objects being addressable by respective ranges of blocks;
using, by hardware circuitry integrated with the data storage device, at least one cryptographic key to encrypt data to be stored on the storage medium;
storing, in an encrypted form, an association between the multiple file system data objects and the respective ranges of blocks;
receiving, from a host computer system, a request for the association between the multiple file system data objects and the respective ranges of blocks;
decrypting, by the hardware circuitry integrated with the data storage device, the association between the multiple file system data objects and the respective ranges of blocks using a cryptographic key;
sending, to the host computer system, the association between the multiple file system data objects and the respective ranges of blocks in decrypted form;
receiving, from the host computer system, a request for an encrypted file system data object;
identifying a range of blocks where the requested encrypted file system data object is stored on the storage medium; and
sending, to the host computer system, the file system data object stored in the identified range of blocks in encrypted form as stored on the storage medium.

17. The method of claim 16, further comprising:
receiving and executing commands from a command set, the command set comprising a command to activate decryption of the data stored on the storage medium;
receiving an encrypted file system data object that has been encrypted external to the data storage device;
storing the encrypted file system data object on the storage medium in encrypted form;
receiving the at least one cryptographic key from a host computer system;

receiving the command to activate decryption of the data stored on the storage medium;

decrypting, by the hardware circuitry integrated with the data storage device, the file system data object on the storage medium using the at least one cryptographic key received from the host computer system; and sending the file system data object in decrypted form to the host computer system.

18. The method of claim 17, further comprising:

receiving and executing commands from a command set, the command set comprising a command to de-activate decryption of the data stored on the storage medium;

after receiving the command to de-activate decryption of the data stored on the storage medium, receiving, from a host computer system, a request for an encrypted file system data object, the request comprising an indication of a range of blocks; and sending the file system data object that is stored in the range of blocks in encrypted form as stored on the storage medium.

19. The method of claim 16, further comprising:

encrypting data to be stored on the storage medium based on different cryptographic keys; and using each key of the different cryptographic keys for one of the respective ranges of blocks addressing a respective file system data object.

20. A data storage device comprising:

means for storing multiple file system data objects using block addressing, the multiple file system data objects being addressable by respective ranges of blocks;

means for using, by hardware circuitry integrated with the data storage device, at least one cryptographic key to encrypt data to be stored on the means for storing;

means for storing an association between the multiple file system data objects and the respective ranges of blocks in an encrypted form;

means for receiving, from a host computer system, a request for the association between the multiple file system data objects and the respective ranges of blocks;

means for decrypting, by the hardware circuitry integrated with the data storage device, the association between the multiple file system data objects and the respective ranges of blocks using a cryptographic key;

means for sending, to the host computer system, the association between the multiple file system data objects and the respective ranges of blocks in decrypted form;

means for receiving a request for an encrypted file system data object from the host computer system;

means for identifying a range of blocks where the requested encrypted file system data object is stored on the means for storing; and means for sending, to the host computer system, the file system data object stored in the identified range of blocks in encrypted form as stored on the means for storing.

\* \* \* \* \*